United States Patent [19]
Hayashi et al.

[11] Patent Number: 5,889,087
[45] Date of Patent: Mar. 30, 1999

[54] FLAME RETARDANT CABLE

[75] Inventors: Akio Hayashi; Katsuhiro Horita, both of Kanagawa-ken, Japan

[73] Assignee: Nippon Unicar Company Limited, Tokyo, Japan

[21] Appl. No.: 842,386

[22] Filed: Apr. 23, 1997

[30]  Foreign Application Priority Data

May 1, 1996 [JP] Japan .................................. 8-110980

[51] Int. Cl.$^6$ ..................................................... H02G 15/00
[52] U.S. Cl. ........................... 523/173; 524/269; 524/436
[58] Field of Search ..................... 524/269, 436; 523/173

[56]  References Cited

U.S. PATENT DOCUMENTS

| | | | |
|---|---|---|---|
| 4,722,959 | 2/1988 | Inoue et al. | 524/412 |
| 4,732,939 | 3/1988 | Hoshi | 524/436 |
| 4,791,160 | 12/1988 | Kato et al. | 524/322 |
| 4,845,146 | 7/1989 | Inoue | 524/436 |
| 5,091,453 | 2/1992 | Davidson et al. | 524/269 |
| 5,132,350 | 7/1992 | Keogh | 524/267 |
| 5,191,004 | 3/1993 | Maringer et al. | 524/265 |
| 5,211,746 | 5/1993 | Keogh et al. | 106/18.26 |
| 5,262,467 | 11/1993 | Keogh et al. | 524/436 |
| 5,288,785 | 2/1994 | Jow et al. | 524/436 |
| 5,296,534 | 3/1994 | Senuma et al. | 524/436 |
| 5,317,051 | 5/1994 | Harashige et al. | 524/310 |
| 5,482,990 | 1/1996 | Jow et al. | 524/436 |

*Primary Examiner*—Paul R. Michl
*Attorney, Agent, or Firm*—Saul R. Bresch

[57]  ABSTRACT

A cable comprising one or more electrical conductors or communications media, or a core of two or electrical conductors or communications media, each electrical conductor, communications medium, or core being surrounded by a composition comprising:

(A) about 40 to about 93 percent by weight of at least one resin selected from the group consisting of ethylene/vinyl acetate copolymer, ethylene/ethyl acrylate copolymer, and an ethylene/alpha-olefin copolymer having a density equal to or less than 0.915 gram per cubic centimeter.

(B) about 5 to about 50 percent by weight of a linear ethylene/alpha-olefin copolymer produced by using a single-site metallocene catalyst and having a melt flow rate of about 0.5 to about 50 grams per 10 minutes; a density of 0.86 to 0.91 gram per cubic centimeter; and an Mw/Mn ratio equal to or less than about 3.0;

(C) about 2 to about 40 percent by weight of an ethylenic resin modified
with a compound or compounds containing a functional group, and
for each 100 parts by weight of components (A), (B), and (C), combined, (D) about 50 to about 250 parts by weight of an inorganic flame retardant; and (E) about 0.05 to about 10 parts by weight of silicone oil.

8 Claims, No Drawings

FLAME RETARDANT CABLE

TECHNICAL FIELD

This invention relates to a flame retardant cable having an insulating layer comprising a blend of resins in combination with a flame retardant filler and a particular processing oil.

BACKGROUND INFORMATION

Polyolefin resins are commonly used as a material for the insulation and the sheath layers of wires and cables. Recently a higher degree of flame retardance has been demanded in accordance with, for example, a vertical tray test, which can be referred to as the "70,000 Btu per hour" test. Flame retardants such as organic halogen compounds; flame retardant aids such as antimony trioxide; or flame retardant resins such as poly (vinyl chloride) and chlorinated polyethylene can be blended into polyolefins to render them flame retardant; however, these additives cause dripping, smoking, and/or the emission of harmful gases when subjected to burning, and can also cause metals to corrode.

To solve these problems, addition of inorganic flame retardants such as metal hydroxides to the polyolefin resins was proposed and the composition was applied as insulating and sheath layers to various wires and cables. This composition, however, requires a considerable amount of inorganic flame retardant, which unfavorably affects the polyolefin resin insofar as extrudability, mechanical properties, heat resistance, flexibility, and low temperature performance are concerned.

DISCLOSURE OF THE INVENTION

An object of this invention, therefore, is to provide a cable having reduced amounts of inorganic flame retardant without sacrificing flame retardancy, and having improved properties. Other objects and advantages will become apparent hereinafter.

According to the present invention, the above object is met by a cable comprising one or more electrical conductors or communications media, or a core of two or electrical conductors or communications media, each electrical conductor, communications medium, or core being surrounded by a composition comprising:

(A) about 40 to about 93 percent by weight of one or more resins selected from the group consisting of ethylene/vinyl acetate copolymer, ethylene/ethyl acrylate copolymer, and an ethylene/alpha-olefin copolymer having a density equal to or less than 0.915 gram per cubic centimeter.

(B) about 5 to about 50 percent by weight of an ethylene/alpha-olefin copolymer produced by using a single-site metallocene catalyst and having a melt flow rate of about 0.5 to about 50 grams per 10 minutes; a density of 0.86 to 0.91 gram per cubic centimeter; and an Mw/Mn ratio equal to or less than about 3.0;

(C) about 2 to about 40 percent by weight of an ethylenic resin modified
  with a compound or compounds containing a functional group, and,
  for each 100 parts by weight of components (A), (B), and (C), combined, (D) about 50 to about 250 parts by weight of an inorganic flame retardant; and (E) about 0.05 to about 10 parts by weight of silicone oil.

DESCRIPTION OF THE PREFERRED EMBODIMENT(S)

The ethylenic resin or resins employed in the present invention as base resin (A) are selected from the group consisting of ethylene vinyl acetate copolymer (EVA), ethylene ethyl acrylate copolymer (EEA), and very low density ethylene alpha-olefin copolymer (VLDPE). EVA and EEA are copolymers, which can be obtained using a conventional high pressure process by copolymerizing ethylene with vinyl acetate or ethylene with ethyl acrylate using a free radical initiator such as an organic peroxide under reaction temperatures in the range of about 150 to about 350 degrees C. and a reaction pressure of about 100 to about 300 MPa.

It is preferred that the EVA and EEA have melt flow rates in the range of about 0.5 to about 50 grams per 10 minutes. The comonomer content of the vinyl acetate or ethyl acrylate can be about 5 to about 40 weight percent, and is preferably about 10 to about 35 weight percent based on the weight of the polymer.

VLDPE is a copolymer of ethylene and an alpha-olefin such as propylene, 1-butene, 1-hexene, 4-methyl-1-pentene, 1-octene, 1-decene, and 1-dodecene. The VLDPE preferably has the following properties: a melt flow rate of about 0.5 to about 50 grams per 10 minutes and a density of 0.86 to 0.91 gram per cubic centimeter.

The VLDPE can be prepared by employing a conventional catalyst such as a Ziegler catalyst or a Phillips catalyst. The polymerisation temperature can be about 0 to about 250 degrees C. and the polymerization pressure can be high pressure (greater than 50 Mpa), middle pressure (10 to 50 Mpa), or low pressure (less than 10 Mpa). The polymerization method can be selected from solution polymerization, suspension polymerization, slurry polymerization, and gas phase polymerization. Catalysts and processes for making VLDPE and other ethylene/alpha-olefin copolymers are described in U.S. Pat. Nos. 4,101,445; 4,302,565; and 4,508,842.

Ethylene/alpha-olefin resins employed in the present invention as base resin (B) can be a copolymer of ethylene and one or more alpha-olefins produced by polymerizing the comonomers in the presence of a single site metallocene catalyst. The alpha-olefin comonomer can be propylene, 1-butene, 1-hexene, 4-methyl-1-pentene, 1-octene, 1-decene, or 1-dodecene. These comonomers can have 3 to 12 carbon atoms, and preferably have 3 to 8 carbon atoms. Among these alpha-olefins, 1-octene is preferred. The ethylene/alpha-olefin copolymer is substantially linear and has a melt flow rate in the range of about 0.5 to about 50 grams per 10 minutes; a density in the rang e of 0.86 to 0.91 gram per cubic centimeter; and a molecular weight distribution, i.e., Mw/Mn, of less than about 3.0, and preferably less than about 2.5.

Throughout this disclosure, melt flow rate is measured in accordance with JIS (Japanese Industrial Standards) K7210; density is measured in accordance with JIS K7112; and molecular weight distribution (Mw/Mn) is measured by size discharge chromatography.

The single-site catalyst used to provide component (B) can also be referred to as a metallocene catalyst or a Kaminsky catalyst. A preferred single site metallocene catalyst system can be described as a constrained geometry catalyst containing a metal coordination complex comprising a metal of groups 3 to 10 or the Lanthanide series of the Periodic Table of the Elements and a delocalized n-bonded moiety substituted with a constraint-inducing substituent, said complex having a constrained geometry about the metal atom such that the angle of the metal between the centroid of the delocalized, substituted π-bonded moiety and the center of at least one remaining substituent is less than such angle in a similar complex containing a similar π-bonded moiety lacking in such a constraint-inducing substituent, and provided further that for such complexes comprising more than one delocalized, substituted π-bonded moiety, there is only one cyclic, delocalized, substituted π-bonded moiety for each metal atom of the complex. The catalyst system further comprises an activating cocatalyst.

Preferred catalyst complexes are represented by the following formula:

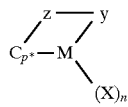

wherein:

M is a metal of groups 3 to 10. or the Lanthanide series of the Periodic Table of the Elements; Cp* is a cyclopentadienyl or substituted cyclopentadienyl group bound in a η5 bonding mode to M; z is a moiety comprising boron, sulfur, or oxygen, said moiety having up to 20 non-hydrogen atoms, and optionally Cp* and 2 together form a fused ring system; each X is independently each an anionic ligand group or neutral Lewis base ligand group having up to 30 non-hydrogen atoms; n is 0 or 1 to 4 and is 2 less than the valence of M; and y is an anionic or nonanionic ligand group bonded to z and M comprising nitrogen, phosphorus, oxygen, or sulfur and having up to 20 non-hydrogen atoms, optionally, forming a fused ring system.

Examples of preferred metal coordination compounds include (tert-butylamido) (tetramethyl-η5-cyclopentadienyl)-1,2-ethanediylzirconium dichloride, (tert-butylamido) (tetramethyl-η5-cyclopentadienyl)-1,2-ethanediyltitanium dichloride, (methylamido) (tetramethyl-η5-cyclopentadienyl)-1,2-ethanediylzirconium dichloride, (methylamido) (tetramethyl-η5-cycloperitadienyl)-1,2-ethanediyltitanium dichloride, (ethylamido) (tetramethyl-η5-cyclopentadienyl) methylenetitanium dichloride, (tert-butylamido)dibenzyl(tetramethyl-η5-cyclopentadienyl)silanezirconium dibenzyl, (benzylamido)dimethyl(tetramethyl-η5-cyclopentadienyl)-silanetitanium dichloride, (phenylphosphido) dimethyl (tetramethyl-η5-cyclopentadienyl)-silanezirconium dibenzyl, and (tertbutylamido) dimethyl (tetramethyl-η5-cyclopentadienyl)-silanetitanium dimethyl.

Suitable cocatalysts for use in single site metallocene catalyst systems include polymeric or oligomeric alumoxanes, especially methyl alumoxane, dimethyl alumoxane, or a modified methyl alumoxane.

Other examples of single site metallocene catalyst systems can be found in U.S. Pat. Nos. 5,272,236 and 5,317,036.

The polymerization for the production of component (B) can be accomplished at conditions well known in the prior art for Ziegler-Natta or Kaminsky-Sinn type polymerization reactions, that is, temperatures from 0 to 250 degrees C., and pressures from atmospheric to 1000 atmospheres (100 MPa). Suspension, solution, slurry, or gas phase processes can be employed.

A support can be used, but the catalysts are preferably utilized in a homogeneous manner. It will, of course, be appreciated that an active catalyst system, especially non-ionic catalysts, will form in situ if the catalyst and the cocatalyst components are added directly to the polymerization reactor together with a suitable solvent or diluent including condensed monomer(s). It is, however, preferred to form the active catalyst in a separate step in a suitable solvent prior to adding same to the polymerization mixture.

A detailed description of a production method for ethylene/alpha-olefin copolymers can be found in Japanese Laid-open Patent HEX 6-30621 and Japanese International Publication HEI 7-500622.

The organo-functional group containing compound modified ethylenic resin (C) of the present invention is obtained by modification of ethylenic resins by a chemical compound containing an organo-functional group. An ethylenic resin is simply one wherein the primary monomer is ethylene. Examples of organo-functional group containing chemical compounds are unsaturated carboxylic acids such as fumaric acid, acrylic acid, maleic acid, crotonic acid, and citraconic acid; unsaturated aliphatic diacid anhydrides such as maleic anhydride, itaconic anhydride, citraconic anhydride, 5-norbornene-2,3-dicarboxylic anhydride, 4-methyl cyclohexene-1,2-dicarboxylic anhydride, and 4-cyclohexene-1,2-dicarboxylic anhydride; epoxy compounds such as glycidyl acrylate, glycidyl methacrylate, and allyl glycidyl ether; hydroxy compounds such as 2-hydroxyethyl acrylic acid, 2-hydroxyethyl methacrylic acid, and polyethylene glycol mono-acrylate; metal salts such as sodium acrylate, sodium methacrylate, and zinc acrylate; silane compounds such as vinyl tri-chloro silane, vinyl tri-ethoxy silane, vinyl tri-methoxy silane, and methacryloxy propyl tri-methoxy silane.

The ethylenic resins, in unmodified form, can have a melt flow rate in the range of about 0.1 to about 50 grams per 10 minutes and a density in the range of about 0.860 to 0.950 gram per cubic centimeter. They can be any ethylene/alpha-olefin copolymer produced by conventional methods using Ziegler-Natta catalyst systems, Phillips catalyst systems, or other transition metal catalyst systems. Thus, the copolymer can be a very low density polyethylene (VLDPE), a linear low density polyethylene (LLDPE), a medium density polyethylene (MDPE) having a density in the range of 0.926 to 0.940 gram per cubic centimeter, or a high density polyethylene (HDPE) having a density greater than 0.940 gram per cubic centimeter. These ethylenic resins can also be such resins as EVA, EEA, high pressure low density polyethylene (HP-LDPE) (HP-LDPE is a homopolymer), or ethylene/alpha-olefin copolymers produced by employing single site metallocene catalysts. These ethylenic resins can be referred to generically as polyethylenes.

An amount of the above-mentioned organo-functional group containing chemical compound to be added to modify the ethylenic resin is preferably in the range of about 0.05 to about 10 weight percent based on the weight of the resin. Modification can be accomplished by, for example, solution, suspension, or melting methods. The solution method is effected by mixing an organo-functional group containing chemical, an ethylenic resin, a non-polar organic solvent and a free radical initiator such as an organic peroxide, and then heating the mixture to about 100 to about 160 degrees C. to perform the modification reaction. Hexane, heptane, benzene, toluene, xylene, chlorobenzene and tetrachloroethane are examples of non-polar solvents. 2,5-dimethyl-2,5-di(t-butyl peroxy) hexane, 2,5-dimethyl-2,5-di(t-butyl peroxy) hexyne-3, and benzoyl peroxide are examples of organic peroxides. In the suspension method, the ethylenic resin, the organo-functional group containing chemical compound are mixed with a polar solvent such as water and then a free radical initiator is added. The mixture is then heated to a temperature above 100 degrees C. to obtain the modified ethylenic resin. In the melting method, the ethylenic resin, the organo-functional group containing chemical compound, and a free radical initiator are introduced into a melting-kneading machine such as an extruder and BANBURY™ mixer to obtain the modified ethylenic resin Typical anhydride modifications can be described as follows: Grafting is accomplished by adding a solution of anhydride, an organic peroxide catalyst, and an organic solvent to polyethylene in particulate form. The organic peroxide catalyst is soluble in the organic solvent. Various organic solvents, which are inert to the reaction, can be used. Examples of useful organic solvents are acetone, methyl ethyl ketone, methyl propyl ketone, 3-pentanone, and other ketones. Other carrier solvents which allow solubilization of peroxide and anhydride, and which strip off well under appropriate devolatilization conditions may be used. Acetone is a preferred solvent because it acts as a stripping agent for residuals such as non-grafted anhydride or anhydride by-products. The anhydride solution can contain abut 10 to about 50 percent by weight anhydride; about 0.05 to about 5 percent by weight organic peroxide catalyst; and about 50 to about 90 percent by weight organic solvent based on the total weight of the solution. A preferred solution contains about 20 to about 40 percent anhydride; about 0.1 to about 2 percent peroxide; and about 60 to about 80 percent solvent.

The anhydride grafted polymer can contain about 0.05 to about 5 or 10 parts by weight of anhydride per 100 parts by weight of polymer and preferably contains about 0.1 to about 2 parts by weight of anhydride per 100 parts by weight of polymer.

Anhydride modification can also be accomplished by copolymerization, for example, by the copolymerization ethylene, ethyl acrylate, and maleic anhydride. The polymerization technique is conventional, and is similar to the polymerization of the underlying comonomers, i.e., ethylene and one or more alpha-olefins. Reference can be made to Maleic Anhydride, Trivedi et al, Polonium Press, New York, 1982, Chapter 3, section 3-2. This treatise also covers grafting.

As noted, component (B) is present in the mixture of resins in an amount of about 5 to about 50 percent by weight based on the total weight of components (A), (B), and (C). Component (C) is present in an amount of about 2 to about 40 percent by weight based on the combined weight of components (A), (B), and (C).

As an inorganic flame-retardant employed in the present invention, the following materials are given as examples. Huntite, hydromagnesite, antimony trioxide, potassium hydroxide, calcium phosphate, zirconium oxide, titanium oxide, zinc oxide, magnesium oxide, magnesium carbonate, calcium carbonate, barium sulfate, barium borate, metabarium borate, zinc borate, meta-zinc borate, aluminum anhydride, molybdenum disulfide, clay, red phosphorus, diatomite, kaolinite, montmorilonite, hydrotalcite, talc, silica, white carbon, celite, asbestos, and lithopone.

The preferred inorganic flame retardants are the hydrated inorganic flame retardant fillers, magnesium hydroxide (most preferred) and alumina trihydrate. While conventional off-the-shelf magnesium hydroxide and alumina trihydrate can be used, a preferred magnesium hydroxide has the following characteristics: (a) a strain in the <101> direction of no more than $3.0 \times 10^{-3}$; (b) a crystallite size in the <101> direction of more than 800 angstroms; and (c) a surface area, determined by the BET method, of less than 20 square meters per gram. The preferred magnesium hydroxide and a method for its preparation are disclosed in U.S. Pat. No. 4,098,762. A preferred characteristic of this magnesium hydroxide is that the surface area, as determined by the BET method, is less than 10 square meters per gram.

The amount of filler used in the composition can be in the range of about 50 to about 250 parts by weight of hydrated filler per 100 parts by weight of the mixture of resins, and is preferably present in the range of about 100 to about 230 parts by weight of hydrated filler per 100 parts by weight of the resin mixture. An upper limit of 150 parts by weight is most preferred.

The hydrated filler can be surface treated (coated) with a saturated or unsaturated carboxylic acid having about 8 to about 24 carbon atoms and preferably about 12 to about 18 carbon atoms or a metal salt thereof, but coating is optional. Mixtures of these acids and/or salts can be used, if desired. Examples of suitable carboxylic acids are oleic, stearic, palmitic, isostearic, and lauric; of metals which can be used to form the salts of these acids are zinc, aluminum, calcium, magnesium, and barium; and of the salts themselves are magnesium stearate, zinc oleate, calcium palmitate, magnesium oleate, and aluminum stearate. The amount of acid or salt can be in the range of about 0.1 to about 5 parts of acid and/or salt per one hundred parts of metal hydrate and is preferably about 0.25 to about 3 parts per one hundred parts of metal hydrate. The surface treatment is described in U.S. Pat. No. 4,255,303. The acid or salt can be merely added to the composition in like amounts rather than using the surface treatment procedure, but this is not preferred.

The silicone oil (E) employed in the invention can be exemplified by the following formula: $R_3$—Si—O—($R_2$—Si—O)$_n$—$R_2$—Si—O—R wherein each R is independently a saturated or unsaturated alkyl group, an aryl group, or a hydrogen atom and n=1 to 5000. Typical groups are methyl, ethyl, n-propyl, isopropyl, n-butyl, isobutyl, phenyl, or vinyl. The silicone oil can also be a glycidyl modified silicone oil, an amino modified silicone oil, a mercapto modified silicone oil, a polyether modified silicone oil, a carboxylic acid modified silicone oil, or a higher fatty acid modified silicone oil. The viscosity of the silicone oil can be in the range of about 0.65 to about 1,000,000 centistokes at 25 degrees C., preferably in the range of about 5000 to about 100,000 centistokes, and most preferably in the range of about 10,000 to about 100,000 centistokes. The silicone oil (E) component is used in an amount of about 0.05 to about 10 parts by weight based on 100 parts by weight of resin, i.e., the combined weight of components (A), (B), and (C).

The resin component, i.e., (A), (B), and (C), of this invention can be combined with conventional additives provided that the particular additive chosen will not adversely affect the composition. The additives can be added to the resin composition prior to or during the mixing of the components, or prior to or during extrusion. The additives include antioxidants, ultraviolet absorbers or stabilizers, antistatic agents, pigments, dyes, nucleating agents, reinforcing fillers or polymer additives, resistivity modifiers such as carbon black, slip agents, plasticizers, processing aids, lubricants, viscosity control agents, tackifiers, antiblocking agents, surfactants, extender oils, metal deactivators, voltage stabilizers, fillers, flame retardant additives, crosslinking boosters and catalysts, and smoke suppressants. Additives can be added in amounts ranging from less than about 0.1 to more than about 5 parts by weight for each 100 parts by weight of the resin. Fillers are generally added in larger amounts up to 200 parts by weight or more.

Examples of antioxidants are: hindered phenols such as tetrakis[methylene(3,5-di-tert- butyl-4- hydroxyhydrocinnamate)]-methane, bis[(beta-(3,5-ditert-butyl-4-hydroxybenzyl)-methylcarboxyethyl)]sulphide, 4,4 Ō-thiobis(2-methyl-6-tert-butylphenol), 4,4 Ō-thiobis(2-tert-butyl-5-methylphenol), 2,2 Ō-thiobis(4-methyl-6-tert-butylphenol), and thiodiethylene bis(3,5-di-tert-butyl-4-hydroxy)hydrocinnamate; phosphites and phosphonites such as tris(2,4-di-tert-butylphenyl) phosphite and di-tert-butylphenyl-phosphonite; thio compounds such as dilaurylthiodipropionate, dimyristylthiodipropionate, and distearylthiodipropionate; various siloxanes; and various amines such as polymerized 2,2,4-trimethyl-1,2-dihydroquinoline. Antioxidants can be used in amounts of about 0.1 to about 5 parts by weight per 100 parts by weight of resin.

The various resins can be crosslinked in a conventional manner, if desired. Crosslinking is usually accomplished with an organic peroxide, examples of which are mentioned with respect to grafting. The amount of crosslinking agent used can be in the range of about 0.5 to about 4 parts by weight of organic peroxide for each 100 parts by weight of resin, and is preferably in the range of about 1 to about 3 parts by weight. Crosslinking can also be effected with irradiation or moisture, or in a mold, according to known techniques. Crosslinking temperatures can be in the range of about 150 to about 250 degrees C. and are preferably in the range of about 170 to about 210 degrees C.

The resins can also be made hydrolyzable so that they can be moisture cured. This is accomplished by grafting the resin with, for example, an alkenyl trialkoxy silane in the presence of an organic peroxide (examples are mentioned above), which acts as a free radical generator or catalyst. Useful alkenyl trialkoxy silanes include the vinyl trialkoxy silanes such as vinyl trimethoxy silane, vinyl triethoxy silane, and vinyl triisopropoxy silane. The alkenyl and alkoxy radicals can have 1 to 30 carbon atoms and preferably have 1 to 12 carbon atoms. The hydrolyzable polymers are moisture cured in the presence of a silanol condensation catalyst such as dibutyl tin dilaurate, dioctyl tin maleate, stannous acetate, stannous octoate, lead naphthenate, zinc octoate, iron 2-ethyl hexoate, and other metal carboxylates. The organic peroxides can be the same as those mentioned above for crosslinking.

The composition can also be blended and kneaded using a BANBURY™ mixer, a HENSCHEL™ mixer, a kneader, a multi-screw extruder, or continuous mixer to obtain a uniformly compounded composition.

The resin composition can be mixed and the cable coated with the resin composition can be prepared in various types of extruders, some of which are described in U.S. Pat. Nos. 4,814,135; 4,857,600; 5,076,988; and 5,153,382. All types of single screw and twin screw extruders and polymer melt pumps and extrusion processes will generally be suitable in effecting the process of this invention as long as they are adapted for mixing or foaming. A typical extruder, commonly referred to as a fabrication extruder will have a solids feed hopper at its upstream end and a melt forming die at its downstream end. The hopper feeds unfluxed plastics into the feed section of a barrel containing the processing screw(s) that flux and ultimately pump the plastic melt through the forming die. At the downstream end, between the end of the screw and the die, there is often a screen pack and a die or breaker plate. Fabrication extruders typically accomplish the mechanisms of solids conveying and compression, plastics fluxing, melt mixing and melt pumping although some two stage configurations use a separate melt fed extruder or melt pump equipment for the melt pumping mechanism. Extruder barrels are equipped with barrel heating and cooling features for startup and improved steady state temperature control. Modern equipment usually incorporates multiple heating/cooling zones starting at the rear feed zone and segmenting the barrel and downstream shaping die. The length to diameter ratio of each barrel is in the range of about 15:1 to about 30:1.

A commercial example of an ethylene/alpha-olefin copolymer (B) is the AFFINITY™ resin, a copolymer produced and sold by the Dow Chemical Corporation. The copolymer is produced with a single site metallocene catalyst and contains 0.01 to 3 long chain branches per 1000 carbon atoms in the backbone of the copolymer.

The advantages of the invention lie in a relatively low amount of inorganic flame retardant, excellent flame- and heat-resistance, mechanical properties superior to conventional products, good moldability, good low temperature performance, good insulating properties, good processability and flexibility, and essentially no emission of harmful gases such as halogen.

As noted, subject cable comprises one or more electrical conductors or communications media, or a core of two or more electrical conductors or communications media, each electrical conductor, communications medium, or core being surrounded by an insulating composition. The electrical conductors are generally copper and the communications media are generally fiber optics made of glass fibers. The term "cable" includes wires.

This specification is based on Japanese patent application 8-110980 filed in Japan on May 1, 1996 for which priority is claimed. The applicant is Nippon Unicar Company Limited and the inventors are Hayashi et al.

Patents, patent application, and other publications mentioned in this specification are incorporated by reference herein.

The invention is illustrated by the following examples.

EXAMPLES 1 TO 16

Antioxidant (tetrakis[methylene (3.5-di-tert-butyl-4-hydroxydrocinnamate)]methane) is added to the resin composition shown in Table 1 and Table 2 at the rate of 1 part by weight of antioxidant per 100 parts by weight of resin and all the components of the composition are kneaded at 160 degrees C. for 10 minutes in a BANBURY™ mixer and extruded to form pellets. 'The pellets are introduced into a 40 millimeter extruder and extruded at 200 degrees C. to form test samples. The samples are evaluated using the following test methods:

1. Tensile Strength (1 millimeter sheet): Measured in accordance with JIS K-6760.

Elongation (1 millimeter sheet): Measured in accordance with JIS K-6760.

2. Heat aging: Test samples are heat-aged for 10 days in an oven maintained at 100 degrees C. to measure residual tensile strength and residual elongation. 65 percent or more retention passes the test and less than 65% retention fails the test.

3. Heat deformation: Test samples of 25 millimeters in length and 6 millimeters in width are stored in an oven maintained at 120 degrees C. for one hour and then loaded with 2000 grams to measure deformation. 50 percent or more deformation passes the test, and less than 50 percent deformation fails the test.

4. Flame-retardance: Eleven test samples (each being 25 millimeters in length) are put side by side perpendicularly and fired by burner of 70,000 Btu per hour from below each test sample. When the burned length of the test sample is 1.5 millimeters or less, the sample passes the test. When the burned length of the test sample is greater than 1.5 millimeters, the sample fails the test.

5. Processability (Moldability): When the resin composition is extruded to form a product without difficulty, it passes the test. When the resin composition is no t extruded smoothly, it fails the test.

The evaluation results are shown in Tables I and II. Examples 1 to 8 are embodiments of the invention. Examples 8 to 16 are comparative examples.

TABLE I

| Examples | 1 | 2 | 3 | 4 | 5 | 6 | 7 | 8 |
|---|---|---|---|---|---|---|---|---|
| Formulation (parts by wt) | | | | | | | | |
| PE 1 | 55 | | | 75 | 45 | 55 | 55 | 50 |
| PE 2 | | 55 | | | | | | |
| PE 3 | | | 55 | | | | | |
| PE 4 | 30 | 30 | 30 | 30 | 30 | 30 | 30 | 30 |
| PE 5 | | | | | | | | |
| PE 6 | 15 | 15 | 15 | 5 | 15 | 15 | 15 | 10 |
| Mg(OH)$_2$ | 160 | 160 | 160 | 160 | 160 | | 120 | 200 |
| Al(OH)$_3$ | 160 | | | | | | | |
| Silicone oil | 1.5 | 1.5 | 1.5 | 1.5 | 1.5 | 3 | 7 | 0.1 |
| Evaluation results | | | | | | | | |
| tensile strength (kg/cm$^2$) | 110 | 105 | 130 | 105 | 115 | 110 | 105 | 155 |
| elongation (%) | 400 | 600 | 200 | 400 | 480 | 275 | 110 | 100 |
| heat aging | pass | pass | pass | pass | pass | pass | pass | pass |
| heat deformation | pass | pass | pass | pass | pass | pass | pass | pass |
| flame retardance | pass | pass | pass | pass | pass | pass | pass | pass |
| processability | pass | pass | pass | pass | pass | pass | pass | pass |

TABLE II

| Examples | 9 | 10 | 11 | 12 | 13 | 14 | 15 | 16 |
|---|---|---|---|---|---|---|---|---|
| Formulation (parts by wt) | | | | | | | | |
| PE 1 | 55 | | 70 | 100 | 55 | 55 | 55 | 55 |
| PE 2 | | 55 | | | | | | |
| PE 3 | 30 | | | | | | | |
| PE 4 | | | 30 | | 30 | 30 | 30 | 30 |
| PE 5 | 30 | | | | | | | |
| PE 6 | 15 | 15 | | | 15 | 15 | 15 | 15 |
| Mg(OH)$_2$ | 160 | 160 | 160 | 160 | 40 | 280 | 160 | 160 |
| Al(OH)$_3$ | | | | | | | | |
| Silicone oil | 1.5 | 1.5 | 1.5 | 1.5 | 5 | 1.5 | 0.001 | 15 |
| Evaluation results | | | | | | | | |
| tensile strength (kg/cm$^2$) | 95 | 90 | 80 | 75 | 155 | 60 | 125 | 35 |
| elongation (%) | 420 | 150 | 380 | 330 | 800 | 75 | 250 | 50 |
| heat aging | fail | fail | fail | fail | pass | fail | pass | fail |
| heat deformation | pass | pass | fail | fail | fail | pass | pass | fail |
| flame retardance | pass | pass | pass | fail | fail | pass | fail | pass |
| processability | fail | fail | pass | pass | pass | fail | fail | fail |

Notes to Tables I and II:
PE 1 is an ethylenelvinyl acetate copolymer having a melt flow rate of 4 grams per 10 minutes and a vinyl acetate content of 25 percent by weight based on the weight of the copolymer.
PE 2 is an ethylene/acrylate copolymer having a melt flow rate of 1.5 grams per 10 minutes and an ethyl acrylate content of 15 percent by weight based on the weight of the copolymer.
PE 3 is an ethylene/1-butene copolymer having a density of 0.910 gram per cubic centimeter; a melt flow rate of 0.5 gram per 10 minutes; and an Mw/Mn of 3.3.
PE 4 is an ethylene/1-octene copolymer having a density of 0.906 gram per cubic centimeter; a melt flow rate of 1 gram per 10 minutes; and an Mw/Mn of 2.4 (this is an AFFINITY ™ resin).
PE 5 is an ethylene/1-butene copolymer having a density of 0.920 gram per cubic centimeter; a melt flow rate of 0.7 gram per 10 minutes; and an Mw/Mn of 3.3.
PE 6 is PE 3 modified with 0.5 percent by weight maleic anhydride based on the weight of PE 3.
The magnesium hydroxide is surface treated with an aminosilane.
The aluminum hydroxide is surface treated with an aminosilane.
The silicone oil is dimethyl silicone oil having a viscosity of 60,000 centistokes at 25 degrees C.

We claim:

1. A cable comprising one or more electrical conductors or communications media, or a core of two or electrical conductors or communications media, each electrical conductor, communications medium, or core being surrounded by a composition comprising:
   (A) about 40 to about 93 percent by weight of at least one resin selected from the group consisting of ethylene/vinyl acetate copolymer and ethylene/ethyl acrylate copolymer;
   (B) about 5 to about 50 percent by weight of a linear ethylene alpha-olefin copolymer produced by using a single-site metallocene catalyst and having a melt flow rate of about 0.5 to about 50 grams per 10 minutes; a density of 0.86 to 0.91 gram per cubic centimeter; and an Mw/Mn ratio equal to or less than about 3.0;
   (C) about 2 to about 40 percent by weight of a polyethylene modified with an unsaturated diacid anhydride; and
      for each 100 parts by weight of components (A), (B), and (C), combined,
   (D) about 50 to about 250 parts by weight of an inorganic flame retardant; and
   (E) about 0.05 to about 10 parts by weight of silicone oil.

2. The cable defined in claim 1 wherein the unsaturated diacid anhydride is maleic anhydride and it is present in the polyethylene in an amount of about 0.05 to about 10 percent by weight based on the weight of the polyethylene.

3. The cable defined in claim 1 wherein component (D) is magnesium hydroxide or alumina trihydrate.

4. The cable defined in claim 1 wherein component (A) is an ethylene/vinyl acetate copolymer or an ethylene/ethyl acrylate copolymer containing, respectively, about 5 to about 40 percent vinyl acetate and ethyl acrylate based on the weight of the copolymer.

5. The cable defined in claim 1 wherein component (B) is a copolymer of ethylene and an alpha-olefin wherein the alpha-olefin has 3 to 8 carbon atoms.

6. The cable defined in claim 1 wherein component (B) has a Mw/Mn ratio of less than about 2.5.

7. The cable defined in claim 3 wherein the inorganic flame retardant is surface treated with a saturated or unsaturated carboxylic acid or salt thereof.

8. The cable defined in claim 1 wherein the silicone oil has a viscosity of about 5000 to about 100,000 centistokes at 25 degrees C.

* * * * *